Patented Nov. 18, 1924.

1,515,714

UNITED STATES PATENT OFFICE.

AUGUST F. WUSSOW, OF CHICAGO, ILLINOIS, ASSIGNOR TO PRICE FLAVORING EXTRACT CO., A CORPORATION OF ILLINOIS.

PROCESS FOR MAKING VANILLA AND OTHER FLAVORING EXTRACTS.

No Drawing.    Application filed May 22, 1922.   Serial No. 562,808.

*To all whom it may concern:*

Be it known that I, AUGUST F. WUSSOW, a citizen of the United States, and a resident of the city of Chicago, in the county of Cook and State of Illinois, have invented certain new and useful Improvements in a Process for Making Vanilla and Other Flavoring Extracts; and I do hereby declare that the following is a full, clear, and exact description of the same.

This invention relates to a process for extracting the flavoring ingredients from vanilla beans or pods, tonka beans or other plant products of similar character. The process is not limited in its application to vanilla beans, but may be applied to other bodies.

It is an object of this invention to prepare the extract without the use of solvents such as alcohol, the use of which is greatly restricted, and without the use of solvents which must be carefully recovered because of their cost. It is, however, possible to use such solvents in combination with the ammonia which is the characteristic extracting agent in this invention.

It is a further object of this invention to employ ammonia for the extraction of the flavoring principles from vanilla beans or other plant products and yet produce an extract which shall not be unfavorably affected by the odor or taste of the ammonia.

Other and further important objects of the invention will be apparent from the detailed description of the several steps of the process which follow. I will first describe one specific way of carrying out this process and then indicate the several variations which may be made from the specific procedure thus described.

As an example of the specific process, I take 100 grams of chopped vanilla beans and cause to percolate through them a menstruum made of 96½% by weight of water and 3½% by weight of ammonia. The percolation is allowed to proceed until 1000 c. c. of the percolate are obtained. This is diluted with 1500 c. c. of water and the resulting mixture is distilled in vacuo at a pressure of between 20 and 25 mm. of mercury until 1500 c. c. of the liquid have been distilled off. This distillation removes nearly all of the ammonia and the residue remaining in the still may be used in the same way as ordinary vanilla extract.

Each of the steps of this process may be varied to a large extent without departing from the spirit of this invention. For example: Instead of an extract made by percolation, as described above, one made by maceration or by a combination of maceration and percolation may be used. Vanilla beans alone, or tonka beans alone, or a mixture of vanilla and tonka beans may be used. The quantity of beans used may be varied from that given above.

To form the ammonia solution used as an extracting liquor any of the usual extracting liquids may be used in place of water, such as the various alcohols, acetone, ether, glycerine, or the glycols. Or the ammonia may be added to a solution of sugar in water or to a mixture of any of the foregoing, either with one another or with water.

After the extract has been made from the vegetable substance by the ammonia solution, the ammonia may be removed in any of several ways nearly as efficiently as by the distillation described above. For example, any suitable non-poisonous acid may be added to the extract to neutralize the ammonia, such as acetic, tartaric or citric acid. Again, the ammonia may be driven off into the atmosphere by heating the extract at a low temperature in an open vessel, or even by letting the extract stand open to the atmosphere without heating. If the extract be heated to boiling, the ammonia will almost all escape. Instead of distilling at a low pressure as described above, the ammonia may be removed by distilling at atmospheric pressure. If the ammonia is removed either by distilling at low pressure or at atmospheric pressure, the ammonia may be recovered in the distillate, or by absorbing it in water or by absorbing it in an acid. The distillation in vacuo is however regarded as the preferable way of getting rid of most of the ammonia.

If a small portion of ammonia remains in the extract after the distillation is completed, it may be neutralized. This may be done by the addition of any of the acids mentioned above.

It is to be understood that the several details of the various steps specified above may be varied through a wide range without departing from the spirit of this invention. For example, different strengths of ammonia may be used and other solvents besides those mentioned may be used with the ammonia. Also the distillation may be carried out at other degrees of vacuum or of pressure from that mentioned, and the relative quantities of beans and extracting liquors may be varied widely. I therefore do not purpose limiting the patent granted otherwise than is necessitated by the prior art.

I claim as my invention:

1. The process of extracting the flavoring principles from vanilla beans, tonka beans and other vegetable bodies capable of yielding a vanilla-like flavor which consists in treating these bodies with a solution of ammonia in a liquid.

2. The process of extracting the flavoring principles from vanilla beans, tonka beans and other vegetable bodies capable of yielding a vanilla-like flavor which consists in treating these bodies with a solution of ammonia in a liquid and separating the ammonia from the dissolved flavoring.

3. The process of extracting the flavoring principles from vanilla beans, tonka beans and other vegetable bodies capable of yielding a vanilla-like flavor which consists in treating these vegetable bodies with a solution of ammonia in a liquid, separating the greater part of the ammonia from the dissolved flavoring, and neutralizing the remainder of the ammonia.

4. The process of extracting the flavoring principles from vanilla beans which consists in causing an aqueous solution of ammonia to percolate through a mass of chopped vanilla beans, diluting the percolate with water, distilling the mixture at a pressure below atmospheric, and neutralizing what ammonia remains in the residue with a harmless acid.

5. The process for the recovery of the flavoring principles from vanilla beans and other vegetable bodies capable of yielding a vanilla-like flavor which consists in dissolving ammonia in an extracting liquid, treating the beans with a solution, and neutralizing the ammonia with an acid.

6. The process for the recovery of the flavoring principles from vanilla beans and other vegetable bodies capable of yielding a vanilla-like flavor which consists in dissolving ammonia in an extracting liquid, treating the beans with the solution, physically removing part of the ammonia from the extract, and adding to the extract sufficient acid to neutralize the remaining ammonia.

7. The process of extracting the flavoring principles from vanilla beans, tonka beans, and other vegetable bodies capable of yielding a vanilla-like flavor which consists in treating these bodies with a non-alcoholic olution of ammonia.

In testimony whereof I have hereunto subscribed my name in the presence of two subscribing witnesses.

AUGUST F. WUSSOW.

Witnesses:
CHARLES W. HILLS, Jr,
CARLTON HILL.